United States Patent [19]

Fox et al.

[11] Patent Number: 5,320,992
[45] Date of Patent: Jun. 14, 1994

[54] DISPOSABLE OXIDE CARRIER FOR SCAVENGING HYDROGEN SULFIDE

[76] Inventors: Irwin Fox, 37 Meadowbrook Country Club Estates, Ballwin, Mo. 63011; Alvin Samuels, 444 Fairway Dr., New Orleans, La. 70124

[21] Appl. No.: 69,073

[22] Filed: May 28, 1993

Related U.S. Application Data

[63] Continuation-in-part of Ser. No. 879,513, May 4, 1992, abandoned, which is a continuation-in-part of Ser. No. 613,857, Dec. 14, 1990, abandoned, which is a continuation-in-part of Ser. No. 498,412, Mar. 26, 1990, abandoned, which is a continuation-in-part of Ser. No. 400,379, Aug. 30, 1989, abandoned.

[51] Int. Cl.$^5$ .............................. B01J 23/70
[52] U.S. Cl. ................... 502/84; 423/242.1; 423/244.01; 423/244.03; 423/244.10
[58] Field of Search ........... 423/231, 242.1, 244.01, 423/244.02, 244.03, 244.1, DIG. 5; 502/84, 87, 406

[56] References Cited

U.S. PATENT DOCUMENTS

| | | | |
|---|---|---|---|
| 2,181,433 | 11/1939 | Jordan | 252/2.5 |
| 4,089,809 | 5/1978 | Farrior, Jr. | 252/459 |
| 4,201,751 | 5/1980 | Holter et al. | 423/210 |
| 4,273,749 | 6/1981 | Kimura et al. | 423/231 |
| 4,324,298 | 4/1982 | Fox | 175/64 |
| 4,366,131 | 12/1982 | Fox | 423/231 |
| 4,478,800 | 10/1984 | van der Wal et al. | 423/230 |
| 4,489,047 | 12/1984 | de Jong et al. | 423/230 |
| 4,550,098 | 10/1985 | Gens | 502/324 |
| 4,956,160 | 9/1990 | Reichert | 423/231 |

FOREIGN PATENT DOCUMENTS

| | | | |
|---|---|---|---|
| 2021275 | 2/1977 | Japan . | |
| 53-110990 | 9/1978 | Japan | 423/231 |
| 8202041 | 11/1983 | Japan . | |

OTHER PUBLICATIONS

Iron spong: still a top option for sour gas sweetening, Anerousis, J. P. and S. K. Whitman, Oil and Gas Journal, Feb. 18, 1985, p. 71.

*Primary Examiner*—Gary P. Straub
*Assistant Examiner*—Timothy C. Vanoy
*Attorney, Agent, or Firm*—Jerome A. Gross

[57] ABSTRACT

A mineral carrier for those iron oxides which react to remove hydrogen sulfide and mercaptans from fluid streams. The new carrier avoids the problem encountered with wood chip beds of bed solidification which occurs when reacted oxide particles adhere to each other. Calcined montmorillonite, for example, possesses the necessary crush strength, porosity, insolubility in water and wettability, to maintain bed perviousness and avoid caking as reaction continues to the full capacity of the oxide.

13 Claims, No Drawings

DISPOSABLE OXIDE CARRIER FOR SCAVENGING HYDROGEN SULFIDE

CROSS-REFERENCE TO RELATED APPLICATIONS

This application is a continuation-in-part of U.S. patent application Ser. No. 07/879,513, filed May 4, 1992, now abandoned, which is a continuation-in-part of application Ser. No. 07/613,857, filed Dec. 14, 1990, now abandoned, which is a continuation-in-part of application Ser. No. 07/498,412, filed Mar. 26, 1990, entitled "Disposable Oxide and Carrier for Gas Stream Purification," now abandoned which is in turn a continuation-in-part of application Ser. No. 07/400,379, filed Aug. 30, 1989, of the same title, now abandoned.

BACKGROUND OF THE INVENTION

1. Field of the Invention

This invention relates to a mineral carrier for oxides, advantageously used in packed beds for scavenging hydrogen sulfide and mercaptans from fluid streams such as natural gas, carbon dioxide, and liquid hydrocarbons.

2. Description of the Related Art

The wood chip process has for many years been used to scavenge hydrogen sulfide from gas streams. Describing this process generally, a stream of the polluted gas is driven through a bed of moistened wood chips containing a reactant iron oxide. While in widespread use, the process has numerous shortcomings, including that the amount of hydrogen sulfide removed is limited to the stoichiometric amount that would react with such $Fe_2O_3$ or $Fe_3O_4$ oxides as are supplied to form pyrites, and also that the pressure of the gas stream suffers a severe drop as it passes through the bed, and that as the oxides react, they in effect cement the bed material into a unified mass. Removing the bed material from the reactor vessel is a difficult and time-wasting procedure; and the removed material is environmentally unsafe. Wood chips are not suited for liquid streams; they become sodden, impairing perviousness of the bed.

A greatly improved iron oxide was shown in U.S. Pat. No. 4,246,244. That oxide, whose particles are composed of a crystalline phase of $Fe_3O_4$ together with an amorphous $Fe_2O_3$ moiety, when suspended in a water slurry and reacted by hydrogen sulfide gas bubbled therethrough, creates a stable waste which after drying does not pollute the atmosphere. The surface area of that oxide is at least 4.0 $m^2/g$; when used in the "dry bed" process described, it has a kinetic "R" value in excess of $0.5 \times 10^{-4}$ $ft.^3/(min.-gram\ oxide)$. At temperatures above approximately 150° C. this improved oxide is destroyed. It is obtainable from Gas Sweetener Associates, St. Louis, Mo. That oxide is hereinafter referred to as the "special" or "preferred" oxide; it is the oxide utilized in all of the tests and discussions which follow except where use of other oxides is particularly pointed out.

U.S. Pat. No. 4,366,131 shows use of that oxide to sweeten gas in a dry process (analogous to the wood chip process) in a bed of inert particulate matter, there shown to be sand. While that patent shows that this special oxide will react effectively in a dry process, objectionable bed caking was encountered even though the bed was shallow. A partially effective expedient, leaving a substantial head-space above the bed and directing the gas upward through it to "fluidize" the bed, was likely to result in breakthrough of unscavenged gas.

Gases to be freed of hydrogen sulfide are often hydrocarbons which can also contain various amounts of mercaptans, carbon dioxide, oxygen, water, and other components. Substantially pure carbon dioxide from fermentation or other sources can also contain hydrogen sulfide. Most often, batch gas sweetening processes are adversely affected by the presence of carbon dioxide due to its tendency to lower pH.

While the foregoing patents were concerned with sweetening gas, a limited use of that oxide to react hydrogen sulfide polluted liquids is shown, for example, in U.S. Pat. No. 4,344,842 in which anhydrous kerosene was simply flowed in admixture or contact with the oxide particles. The addition of the particles to aqueous drilling muds, made corrosive by pollution with hydrogen sulfide, as well as oxygen, is taught in U.S. Pat. No. 4,634,539.

Other types of sweetening processes, when applied to liquids, have been generally unsatisfactory. For example, the wood chip process, widely used for sweetening gas, is not suited for contaminated liquids; the chips become saturated non-uniformly, causing premature channeling through the chip bed, low reaction efficiencies and unpredictable results. Amine processes are expensive, and it is difficult to separate the amines from liquid hydrocarbons.

SUMMARY OF THE INVENTION

The present invention provides a new porous mineral carrier for hydrogen sulfide reactants of the oxide type, and particularly for the non-polluting iron oxides above mentioned. The new carrier is strong and light in weight; it maintains perviousness in deep beds, yielding a low pressure drop per foot of bed height. This characteristic obviously made the new carrier well suited for sweetening gas streams; breakthrough of the gas stream is avoided. The oxide particles are originally somewhat bonded to and within the carrier particles pre-moistened with water. When the intermixture of this special iron oxide therein does not exceed about fifteen pounds of oxide per cubic foot of the carrier, the oxide material may reach nearly its maximum reactant capacity without causing the bed to solidify into a tightly cemented mass, as in the prior art. The preferred iron oxide, when prepared as a bed material in the above manner, successfully removed hydrogen sulfide from streams of hydrocarbon gases with or without the presence of mercaptans, carbon dioxide, oxygen or water, and also from substantially pure carbon dioxide. The presence of carbon dioxide increased the rate of reaction and the presence of oxygen significantly increased the amount of hydrogen sulfide which could be removed by a given amount of the preferred iron oxide.

Experimentation with sweetening liquids followed, with unexpectedly favorable results. Thus:

Liquid hydrocarbons which have relatively few carbon atoms—varying from propane (3) and butane (4) to at least decane (10)—can be readily sweetened by the present particles in substantially the same manner as hydrocarbon gas. It was originally feared that the hydrocarbon liquid would wash the oxide particles from the surfaces and interstices of the carrier on which they have been distributed. This proved not to occur when the flow rate through the particle bed was not excessive. Even the flow of water at substantially the same controlled flow rate did not wash away the oxide from the pre-moistened carrier particles.

Thus, the new carrier material so retains the oxide particles as to sweeten liquid flows as well as gases.

The new carrier is preferably a mineral, advantageously clay-like in character such as montmorillonite, calcined at a temperature of approximately about 400° F. Montmorillonite so calcined has a dry weight of approximately 42 lbs. per cubic foot, or in any event between 35 and 45 lbs. per cubic foot. Calcining yields a porous, yet strong texture; its crush strength is sufficient to bear without crushing an overlaying bed of the material, moistened and with oxide intermixed, well over five feet deep and, it appears as much as 20 feet deep. The quantity of oxide is preferably about 15 lbs. per cubic foot of carrier, but in shallow beds, particularly those in cartridge form, the oxide quantity may be as great as 35 lbs. or more per cubic foot of carrier. Less oxide (from 6-15 lbs. per cubic foot of carrier) may be used when oxygen is present in amounts above at least that stoichiometrically required to react all hydrogen sulfide to elemental sulfur and water. The calcined mineral carrier material is substantially insoluble in water but has the capacity to absorb water sufficiently to disperse on its surface at least 15 lbs. of oxide per cubic foot. For all practical purposes, it is chemically inert to hydrogen sulfide, mercaptans, and the products of reaction thereof. For use in a bulk bed (rather than a cartridge, when solidifying is of no consequence) fine particles should be removed, so that no more than 3% of the calcined material will pass through a 30 mesh screen.

DESCRIPTION OF THE PREFERRED EMBODIMENT

Even though the experience utilizing sand as the bed or carrier material, heretofore set forth, was not considered commercially satisfactory for gas purification, several considerations led to the conclusion that a mineral carrier was necessary. Among these were the requirement that the carrier be chemically inert in the presence of hydrogen sulfide and of its reaction products, and that the carrier be relatively strong so as to resist an overlaying weight of a bed at least 5 ft. and as much as 20 ft. deep. The problem of caking, encountered both with sand and with wood chips, was further analyzed, and led to the following theory, which test experience demonstrated was valid:

Iron oxides of both the old and the improved type tend to clump and bind together shortly after beginning to react with hydrogen sulfide. If these particles can be maintained somewhat isolated from each other, a much greater part of their reactive capacity may be utilized. To maintain such relative isolation, their carrier must have adequate surface areas to which they can cling. To obtain these characteristics, the carrier must be somewhat pervious.

Calcining removes moisture and impurities from the present carrier mineral, and leaves a hard, strong, porous and pervious structure, not soluble in water, which may be readily wetted with water so that intermixed oxide particles will cling, dispersed along the wet surfaces so provided, and continue to do so even after being partly reacted, rather than agglomerating with each other. The amount of oxide clinging in this dispersed manner appears to be at least 9 lbs. of oxides and probably over 15 lbs. per cubic foot of the calcined wetted carrier material.

The necessary perviousness and surface area are provided by calcining clay-like minerals, of which montmorillonite appears to be especially well suited. Calcined montmorillonite possesses the strength required for such bed depth, together with such surface area including cracks, pores and interstices to which the oxide particles may cling substantially separated from each other.

It was not at first apparent that such a bed of clay particles with the oxide intermixed would remove hydrogen sulfide and mercaptans from liquid hydrocarbons also, especially those hydrocarbon liquids with 10 or fewer carbon molecules. Controlling the rate of liquid flow—either upflow or downflow—to 1½ ft. per minute, avoids washing the oxide particles from the surfaces of the clay particles, as shown by the tests hereafter.

Preparation of the Material

The preferred clay mineral is montmorillonite calcined at a temperature of about 400° F. whose particle size is preferably between 4 mesh and 30 mesh, with no more than about 3% so small as to pass through a 30 mesh screen. Its dry weight is between 35 lbs. and 45 lbs. per cubic foot. A quantity of this material is placed in a rotary mixer, such as a typical concrete mixer, and rotated while a predetermined quantity of water—typically slightly less than one-third of the weight of the mineral—is sprayed into the mixer, to assure thorough moistening. This is done slowly, preferably over a period as long as a half hour. Then a slightly greater quantity of the oxide particles are slowly added while the mixing continues for perhaps another half hour. A small amount of sodium sulfite is preferably added as well, out of the belief that it cleans the surface of the mineral and promotes the adherence of moisture and of the oxide. The moisture causes the oxide particles to adhere to the surfaces and interstices of the calcined clay, in such manner as to avoid their clumping together.

An optimum mixture, sold by Gas Sweetener Associates, St. Louis, Mo., under the trademark "SulfaTreat", is believed to be approximately:

| Ingredient | % |
|---|---|
| Montmorillonite | 59 |
| Oxide (as above) | 22 |
| Water | 18 |
| Sodium sulfite | 1 |
|  | 100 |

Wide divergence from the above proportions may be utilized; it is believed that, with any quantity of the clay there may be used, with advantage, roughly one-third as much by weight of both water and the oxide.

Tests Related to Sweetening Gas

The following tests were conducted at a gas well site with a gas composition as follows: carbonyl sulfide 4 ppm, $H_2S$ 630 ppm, ethyl mercaptan 15 ppm, methyl mercaptan 4 ppm, propyl mercaptan 12 ppm, C4+ mercaptan 14 ppm, miscellaneous sulfides 10 ppm, with the balance methane.

Test No. 1. A 20"×20' process tower was employed. Perlite containing approximately 20 lbs. per cubic foot of oxide was used. The material completely removed $H_2S$ for four days before breakthrough of $H_2S$ occurred. The material should have lasted for seven days.

It was found that the perlite bed had compacted causing pressure in the bed to increase locally, causing channeling of the gas. Subsequently the material was hard to remove.

Test No. 2. A 4"×12' test tower was employed on the same location. Calcined clay (montmorillonite) containing 18 lbs. per cubic foot of the reactive iron oxide was used to fill the 12' test tower. The test was aborted prematurely due to an unrelated cause. Even though the oxide had not been fully reacted, the bed had largely solidified and was difficult to remove from the reactor.

Test No. 3. The 4"×12' test tower was employed. From the calcined clay material was removed all particles of less than 30 mesh size. To pack the tower, the preferred oxide was loaded at the rate of 15 lbs. per cubic foot of carrier, instead of the 18 lbs. loading of Test No. 2. In this case the H₂S and mercaptans appeared to be completely reacted. The bed material was then easily removed from the reactor. While slightly agglomerated, either slight agitation or a water stream sufficed to dislodge it.

Test No. 4. This test was similar to Test No. 3 except in the following respects: 1% of the minus 30 mesh material was permitted to remain, and 18 lbs. of oxide was added per cubic foot of the carrier material. At this increased concentration of iron oxide the caking of the bed material was substantially increased, leading to the conclusion that the oxide concentration was undesirably greater.

Test No. 5. The conditions of this test duplicated those of Test No. 4, except that only 15 lbs. of the preferred oxide were used per cubic foot of the carrier material. The results were as in Test No. 3; excellent efficiency of reaction; the reacted bed was easy to remove. The test demonstrated a workable combination of particle size distribution and oxide loading. The conclusion drawn was: When the new carrier material with oxide intermixed is utilized in bulk in a reactor tower, time and labor are saved by keeping the oxide loadings under 18 lbs. of oxide per cubic foot of carrier.

The tests listed hereafter were laboratory tests

Test No. 6. The purpose of this test was to evaluate the effectiveness of the new carrier with ordinary iron oxides. A laboratory reactor 1 cm.×25 cm. filled with 15 lbs. per cubic foot of a hydrated iron oxide of the gamma alpha crystalline form, commonly used to treat hydrogen sulfide, was intermixed with the calcined clay carrier. After the reaction had proceeded approximately one-half of 1% toward completion, the bed was checked and its material was found to be easily removable. At full reaction the bed was found still not tightly cemented. However, using such an oxide, all the reacted material would be acid soluble, and environmentally unsafe.

Test No. 7. A similar run was made using the same iron oxide hydrate on wood chips, where similarly only slightly reacted, the fill was found to be already severely cemented; it had to be removed by acid and pressurized water. The rate of reaction of the hydrated iron oxide material was the same as in Test No. 6 and the pressure drop was substantially less, comparable to that using the preferred iron oxide on the carrier.

Test No. 8. Pressure Drop Determinations: A bed of the calcined clay, only 1% of which was smaller than 30 mesh, packed in the proportion of 15 lbs. of reactive iron oxide per cubic foot of carrier, was found to be relatively porous, offering only small resistance to gas flow. Laboratory experiments using a water differential manometer resulted in determining the following coefficient correlating pressure drop dP (psi) to v (gas flow velocity in feet per minute), and bed height h (feet):

$$dP = 0.0009 \times v \times h$$

The coefficient 0.0009 was nearly constant over a wide range of gas velocities 0.8 ft/min. to 8 ft/min. This confirms the uniform permeability of the bed even at low flow rates.

In contrast, in using the oxide with wood chips the initial pressure drop, before reacting the oxide, was approximately 0.0015; after reaction in the field the pressure drop would be so much greater as to be likely to cause breakthrough and channeling of the gas.

Test No. 9. Field Evaluation in Two-Tower System: Twelve test runs were made at a site having a reactor system comprising two towers in series, filled 10 feet deep, as with above Test 3, to provide an average reacted height of 5.98 feet (10 feet nominal). The theoretical effectiveness quotient E of the preferred oxide material (how much hydrogen sulfide can be reacted per pound of oxide) was previously determined as: $E = 0.715$. The concentration of H₂S in the gas changes in time of progression through the bed, as does the reactant capacity of the partly reacted oxide particles whose theoretical reaction rate is R. The theoretically predictable amount of hydrogen sulfide removable by each packed bed depends upon a number of variables, including the inlet velocity v of the gas. How much hydrogen sulfide should be reacted from a given gas stream by a given bed may be calculated by use of the following differential equations for reaction and flow in a fixed bed:

$$\frac{d(H_2S)}{dt} = -v \times \frac{d(H_2S)}{dX} - R(H_2S)(Oxide)$$

$$\frac{d(Oxide)}{dt} = -\frac{R}{E}(H_2S)(Oxide)$$

For the twelve test runs so made the calculated predicted amount of H₂S to be removed was 10,263 lbs. The actual amount found to be removed was 10,117 lbs. This demonstrated that the present material functions with highly predictable results.

While the foregoing tests were of streams of natural gas containing H₂S and mercaptans, it is apparent that the new inert mineral carrier will function as well to remove H₂S from other gas streams such as carbon dioxide.

Test No. 10. A small laboratory column packed with "SulfaTreat" material was fed with carbon dioxide gas containing 1000 ppm of hydrogen sulfide at 77° F. and 6 ft/min. velocity. One test, in which the gas was bubbled through water prior to entering the column, resulted in removal of hydrogen sulfide at a reaction rate of $14 \times 10^{-4}$ cu.ft./min. gram iron oxide. The reaction rate was approximately twice that obtained using nitrogen, rather than carbon dioxide, as the carrier gas.

It is known that the reaction rate of hydrogen sulfide with the preferred oxide increases as pH decreases. The conclusion reached is that the presence of carbon dioxide lowers the pH at the sites of reaction thereby increasing the rate of reaction. Such an increased reaction rate appears to permit more complete reaction of iron oxides substantially to the outlet of a column, and thus uses less oxides per unit of hydrogen sulfide removed.

Additional unexpected benefits are seen when oxygen is present in the gas from which hydrogen sulfide is to be removed, as shown in the next example.

Test No. 11. A field test of the removal of hydrogen sulfide from a stream containing 99% carbon dioxide, 2350 ppm hydrogen sulfide and 1% oxygen was carried out with a 3.825 in. ID column with a 4.333 ft. bed depth of "SulfaTreat" material. The temperature was 113° F., the flow rate was 3300 standard cubic feet per day and the pressure was 140 psig. Average hydrogen sulfide at the bed outlet was under 0.1 ppm after 496 hrs. The amount of hydrogen sulfide removed by the bed material was 2.4 times the amount that would have been predicted when using either nitrogen or methane as a carrier gas with no oxygen present. Subsequent testing of the bed material showed the presence of elemental sulfur.

Further testing showed that oxygen was increasingly beneficial to the reactive capacity of the iron oxide when supplied up to a level at least equal to the stoichiometric amount required to react all hydrogen sulfide in the gas stream to elemental sulfur and water by the following reaction, in which the oxide appears to serve as a catalyst:

$$H_2S + \tfrac{1}{2}O_2 \rightarrow S + H_2O$$

also, that the beneficial effects of added oxygen were also obtained when hydrocarbon gases, or mixtures of hydrocarbon gases with carbon dioxide, are used as the carrier gas instead of substantially pure carbon dioxide.

Tests Related to Sweetening Liquids

Test No 12. A first series of tests was conducted to determine what rate of liquid flow through a bed of the material could be permitted without entraining and carrying away the oxide particles. A bed of the material prepared, as heretofore set out, was made by placing 105 g. of the material in a glass chromatography column 18 mm. in inner diameter by 40 cm. long, with a stopcock at the bottom. The final bed height was 34 cm. Reagent grade hexane was poured into the column to produce a wetted bed with very few air bubbles.

Hexane (which contains 6 carbon atoms) into which about 170 ppm. by weight of $H_2S$ had been dissolved, was put into a one liter filter flask. The inlet side of the flask was connected to a nitrogen gas cylinder, and the outlet for liquid hexane was connected to the top of the chromatography column containing the prepared bed. Gas at a measured flow rate forced liquid at the same flow rate down through the column, where samples were collected at the open stopcock.

200 ml. samples of liquid flowing out of the column were collected at each of two liquid flow rates, 100 ml./min. (equivalent to a velocity of 1.3 ft./min.) and 25 ml./min. (equivalent to 0.3 ft./min.). The samples were collected after 200 ml. of liquid was discarded between collections to insure equilibration of the prepared material with the liquid at each flow rate.

50 ml. of each collected sample from the column, and two blank samples, one with $H_2S$ that had not passed through the column and one that was pure hexane containing no $H_2S$, were each placed in a 50 ml. Erlenmeyer flask. In each of the four flasks a cleaned copper strip ½" wide by 3" long by 0.002" thick was inserted, and the stoppered flasks were then placed in a 100° F. oven for one hour. This "copper strip" test follows approximately the procedure given in ASTM Standard Test Method D 1838-84, "Copper Strip Corrosion by Liquified Petroleum (LP) Gases."

Results of the "copper strip" comparison tests were as follows:

Comparison strip 1 (no $H_2S$): strip shiny and like new;

Comparison strip 2 (hexane with $H_2S$ not passed through column) dark tarnish;

Test strip exposed to collected fraction at 1.3 ft./min. through column: very slight tarnish;

Test strip exposed to collected fraction at 0.3 ft./min.: strip shiny and like new.

The foregoing tests proved that the described iron oxide distributed in the present carrier removed $H_2S$ from the hydrocarbon hexane at flows up to 1.3 ft./min. and substantially to 1.5 ft./min. Similar results are evident for any hydrocarbon liquid from liquid propane (3 carbon molecules) to decane (10 carbon molecules), since the physical and chemical properties of the series of hydrocarbons up to C10 are similar except for boiling and freezing points.

Test No. 13. This test was performed to determine the flow properties when liquid was flowed from the bottom up through the column, packed as in Test No. 10. Flow rates varied from 0.3 ft./min. to 2 ft./min. At 1.5 ft./min. and below, there were no appreciable amounts of black oxide "fines" carried upward from the top of the packed column; above about 1.5 ft./min. appreciable amounts of fines were stripped from the column and carried along with the liquid hexane. It appears that flow from the bottom up toward the top of the bed is quite feasible as long as velocities less than 1.5 ft./min. are used.

Alternative Embodiment

Where only small quantities of gas are to be scavenged, cartridge packs may be made up of the preferred oxide intermixed with the present carrier material, for use in relatively small normally cylindrical steel reactor vessels such as are commercially available for accepting cartridge fills of the type adapted for end-to-end flow. Such cartridges are typically metal or plastic tubes having pierced screens at each end. For various capacities of hydrogen sulfide removal, the cylinder and cartridges are provided in various depths, typically not more than 5'.

When such a cartridge is packed with the preferred oxide above described, utilizing the present carrier material, reaction presents no clean-out problems; the cartridges are simply removed and discarded. Hence the cartridge pack is constituted slightly differently than the bed material in Tests 3 and 5 above, in these respects:

Since the bed depth is relatively small, and cartridges are to be discarded, there is no need to avoid agglomeration of the bed; hence the proportion of oxide to carrier may be increased to preferably 30, or as much as 35 lbs. of oxide per cubic foot of carrier. Pressure drop is not a problem in the agglomerated bed even when high oxide concentrations result in solidification of the material. However if hydrogen sulfide is present in the gas stream in only very small concentrations, as little as 9 lbs. of oxide per cubic foot of carrier need be used. In either case it is not necessary to limit the amount of fine particles, compared to the reactor vessels heretofore described.

The particulate nature of the calcined mineral particles and the phenomenon that the moisture on their surfaces tends to retain the oxide particles, to avoid cementing the bed as the oxide particles react, offers the advantage of quick, easy clean-out and replacement of the bed when substantially fully reacted, while meantime maintaining bed perviousness. Since the reaction products of the preferred oxide are non-polluting to the atmosphere, the easy clean-out affords great advantage to the present invention.

As modifications may be made in the embodiments herein described without departing from the scope of the invention, it is intended that all matter contained in the foregoing description shall be interpreted as illustrative rather than limiting.

We claim:

1. A process for preparing a disposable bed material comprising the steps of calcining and crushing into carrier particles a mineral whose crush strength is sufficient to bear an overlaying bed of said mineral at least five feet deep, said mineral being further characterized by substantial insolubility in water, chemical inertness to hydrogen sulfide and mercaptans and to products of reaction thereof, and by a surface area sufficient to afford dispersion on the surfaces of each cubic foot thereof of at least nine pounds of iron oxide capable of reacting with hydrogen sulfide and mercaptans, screening the particles so that substantially all of the particles are of a size between about 4 mesh and about 30 mesh and no more than about 3% are below 30 mesh, so that the particle size distribution produced by said screening is such as to minimize the pressure drop of the hydrocarbon gases across a bed produced from the particles, moistening said carrier particles with water, and intermixing with said moistened carrier particles, 9 to 35 pounds of iron oxide particles composed of a crystalline phase of $Fe_3O_4$ together with an amorphous $Fe_2O_3$ moiety which react with hydrogen sulfide and mercaptans for every cubic foot of carrier particles, the weight ratio of the iron oxide particles to water being such that cementing of a bed produced from the intermixed carrier particles and iron oxide particles is prevented.

2. A process as defined in claim 1 wherein the ratio of the dry weight of ion oxide particles to the weight of water is not substantially greater than one to one.

3. A process as defined in claim 1 wherein the material is montmorillonite.

4. A process as defined in claim 1 wherein sodium sulfite is added along with said water in said moistening step.

5. The process defined in claim 1, wherein
   any of the steps so defined are performed at times or locations different from those at which other of said steps are performed.

6. A process of preparing and using a pervious bed comprising the steps of
   preparing a pervious bed of disposable material as defined in claim 1, and
   flowing a hydrogen sulfide and/or mercaptan contaminated fluid therethrough at a rate below that which would remove said iron oxide particles from the surfaces of said moistened carrier particles.

7. The process defined in claim 6, wherein
   such fluid is a gas.

8. The process defined in claim 6, wherein
   such fluid includes a hydrocarbon gas.

9. The process defined in claim 6, wherein
   such fluid is a liquid.

10. The process defined in claim 6, wherein
    such fluid is an aqueous liquid.

11. The process defined in claim 6, wherein
    such fluid includes a hydrocarbon liquid.

12. A process according to claim 6, wherein the fluid is gaseous and contains carbon dioxide.

13. A process according to claim 6, wherein oxygen is added to convert at least part of the hydrogen sulfide and/or mercaptans into sulfur.

* * * * *

UNITED STATES PATENT AND TRADEMARK OFFICE
CERTIFICATE OF CORRECTION

PATENT NO. : 5,320,992
DATED : June 14, 1994
INVENTOR(S) : Fox, Irwin, et al.

It is certified that error appears in the above-identified patent and that said Letters Patent is hereby corrected as shown below:

In Column 3, line 8, delete "F" and substitute ---C---.

In Column 4, line 21, delete "F" and substitute ---C---.

In Column 8, line 8, before "dark" insert ---:---.

Signed and Sealed this

First Day of November, 1994

*Attest:*

BRUCE LEHMAN

*Attesting Officer*      *Commissioner of Patents and Trademarks*